Patented June 9, 1925.

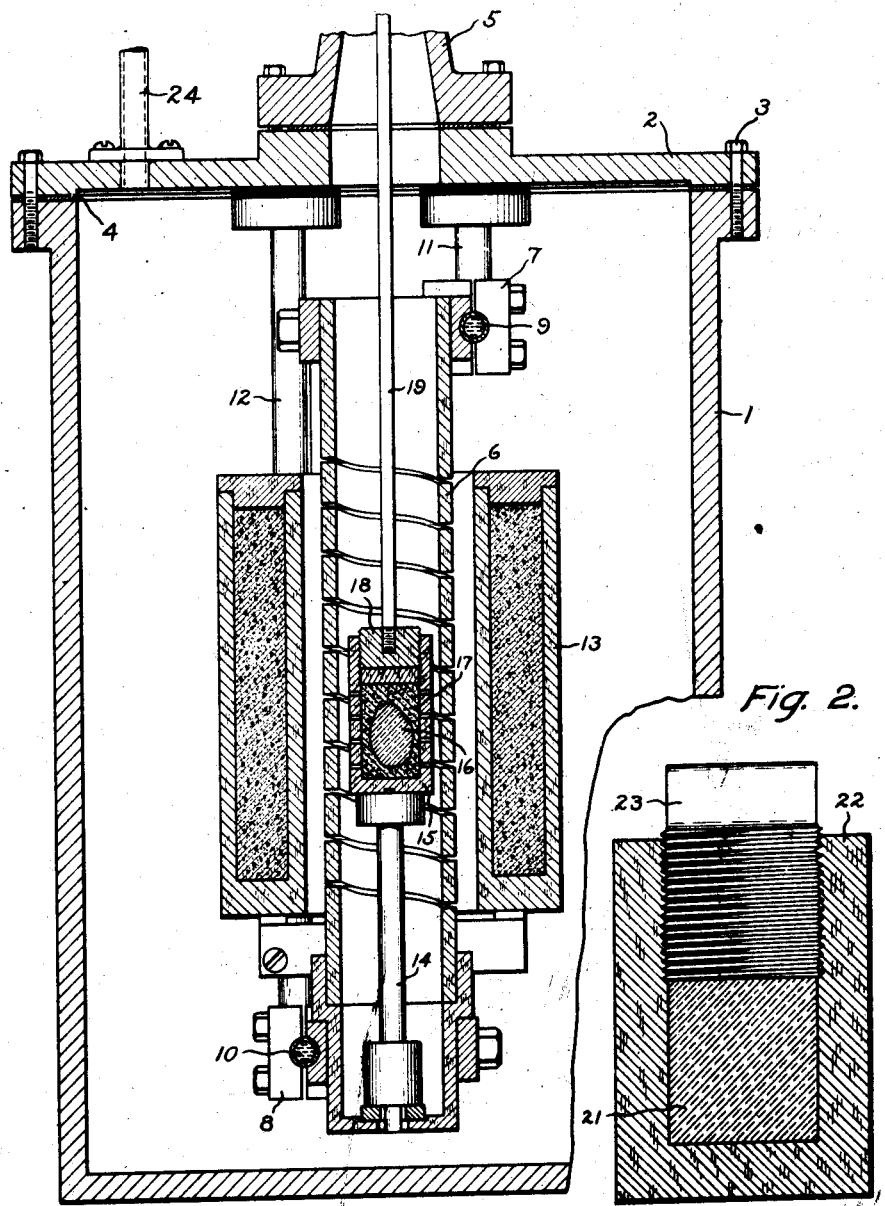

1,541,584

UNITED STATES PATENT OFFICE.

LEVI B. MILLER, OF LYNN, MASSACHUSETTS, ASSIGNOR TO GENERAL ELECTRIC COMPANY, A CORPORATION OF NEW YORK.

PROCESS OF MAKING VITREOUS SILICA.

Application filed August 10, 1921. Serial No. 491,122.

*To all whom it may concern:*

Be it known that I, LEVI B. MILLER, a citizen of the United States, residing at Lynn, county of Essex, State of Massachusetts, have invented certain new and useful Improvements in Processes of Making Vitreous Silica, of which the following is a specification.

The present invention relates to the manufacture of masses of bubble free, transparent vitreous silica or quartz glass, as it is commonly called.

When clear native quartz crystal is heated progressively from ordinary room temperature up to about 550° C., the differences in coefficient of expansion along different axes of the crystal usually causes cracking or shattering of the crystal. When at a higher temperature the pieces resulting from the cracking of the quartz crystal coalesce by fusion, numerous air bubbles are trapped which are removable only with the greatest difficulty, if at all. Various methods have been suggested and used in order to avoid the trapping of air bubbles. One of the most successful of these methods involves the heating of the quartz in convenient form, usually as coarse particles, in a highly evacuated space so as to reduce to a minimum the inclusion of air or other gases at the coalescence of the quartz particles. Some gas bubbles are nevertheless enclosed by the coalescence and fusion of the quartz particles, requiring subsequent manipulation of the quartz fusion in order to remove or reduce the bubbles. For some purposes, particularly for optical purposes, it is desirable to produce fused or vitreous silica which is entirely devoid of bubbles, particularly of the exceedingly minute bubbles which give fused silica a milky appearance.

In accordance with my invention perfectly transparent, clear silica is produced by heating in a vacuum masses of clear quartz crystals mechanically confined in such a way as to prevent displacement of the particles resulting from the disintegration of the quartz when passing through the temperature of about 550°. Preferably the quartz is thereupon heated as a single operation to a high enough temperature to fuse the same and coalesce the particles, while thus supported, thereby producing a clear mass of fused quartz.

The accompanying drawing shows apparatus suitable for carrying out my invention, Fig. 1 showing in vertical section a vacuum furnace in which a mass of crystalline quartz is heated while packed in granular or powdered graphite. Fig. 2 illustrates a modified support for a mass of crystalline quartz.

Referring to the drawings, a vacuum furnace has been indicated in Fig. 1 somewhat diagrammatically as furnaces of this class are well known. The furnace comprises an outer metallic tank 1 having a removable cover 2, the cover being connected to the tank by any suitable mechanical means, indicated as bolts 3, suitable gas-tight washers 4 being employed. The furnace may be provided with a removable column 5 mounted upon the cover. The column 5 is shown in part broken away as its construction is well understood. A suitable construction is shown in my prior application Ser. No. 457,660 filed April 1, 1921 and in United States Patent No. 1,536,821, issued to Philip K. Devers on May 5, 1925. The column may be provided with a window for viewing the interior of the furnace or through the column a charge may be introduced into the furnace. The furnace is provided with a helical resistor 6 consisting of graphite, or other suitable material, and mounted at its opposite ends upon suitable electric terminals 7, 8. The terminals may be water-cooled by ducts 9, 10, the cooling water being supplied by tubes 11, 12, which serve also as supports and current conductors for the resistor. The tubes 11, 12 are supported from the cover of the furnace, suitable electrical insulation being provided as indicated in the drawing. Surrounding the resistor 6, is a heating screen 13, which conveniently consists of a box of carbon or graphite containing a powdered refractory material, such as charcoal or fine graphite. Upon the pedestal 14 resting upon the lower closed end of the heater 6 is a crucible 15. In this crucible is contained a unitary mass of clear crystalline quartz 16 tightly packed within the graphite particles 17 so as to prevent mechanical displacement of the crystalline parts resulting from the shattering of the crystal, as above explained. The crucible 15 may be provided with vent holes, as indicated in the drawing, the top being preferably closed by a plug of graphite 18 so as to firmly confine the crystal from displacement. The rod 19 secured to the graphite plug 18 may be used to introduce the crucible and its charge in the furnace, and to remove the same.

In some cases when unusual care should be taken to prevent entry of particles of graphite into cracks adjacent the surface of the crystal quartz, and to more securely support the quartz crystal, a packing for the crystal may be used which is illustrated in Fig. 2. In this case the mass of crystalline quartz 21 is shaped by grinding, or otherwise, to conform to the interior of the crucible 22, and a plug 23 is screwed thereto or otherwise firmly secured to the walls of the crucible 22 in contact with the crystalline mass 21.

When the furnace has been charged by the crystalline mass supported by either of the above methods, the interior is evacuated through a tube 24 and the temperature is increased as fast as permissible without causing local overheating or damage to the furnace parts. No particular care need be taken to heat the crystal at any slower or faster rate below the conversion temperature of 550° C. than above this temperature. When the quartz mass has been heated to a high enough temperature to cause softening, say a temperature of about 1650°–1700° C. the heat may be discontinued, as at this temperature the crystalline particles will coalesce so that upon cooling a uniform clear structureless mass of amorphous silica is secured. This clear structureless mass of amorphous silica may be subsequently manipulated when heated to a temperature of plasticity or may be mechanically shaped by cutting, grinding or otherwise in order to produce lenses or other objects of desired form.

What I claim as new and desire to secure by Letters Patent of the United States, is,—

1. The method of producing vitreous silica which consists in heating a unitary mass of crystalline quartz to a temperature sufficiently high to convert the same into plastic vitreous silica while supporting said mass to prevent displacement of crystal particles resulting from the disintegration of said crystalline quartz.

2. The method of producing clear vitreous silica or quartz glass which consists in heating quartz in the crystal state to a fusing temperature in a vacuum while mechanically supporting said quartz to prevent displacement of particles resulting from the cracking of said quartz when heated to a temperature of about 550° C.

3. The method of producing clear silica glass which consists in mechanically shaping a unitary mass of clear crystalline quartz to conform to the interior dimensions of a mold, confining the shaped quartz in said mold and heating said quartz while held in said mold to a temperature sufficiently high to convert the quartz from the crystalline to the amorphous state.

In witness whereof, I have hereunto set my hand this 8th day of August, 1921.

LEVI B. MILLER.